United States Patent [19]

Andrews, deceased et al.

[11] 3,710,323

[45] Jan. 9, 1973

[54] PATTERN-SIZE NORMALIZING FOR RECOGNITION APPARATUS

[75] Inventors: Douglas R. Andrews, deceased, late of Rochester, Minn. by Marjorie E. Andrews; Milton J. Kimmel, Rochester, Minn.

[73] Assignee: International Business Machines Corporation, Armonk, N.Y. ; by said Kimmel, a part interest

[22] Filed: Dec. 13, 1971

[21] Appl. No.: 206,989

[52] U.S. Cl. ..........340/146.3 H

[51] Int. Cl. ..........G06k 9/04

[58] Field of Search..340/146.3 R, 146.3 H, 146.3 T, 340/146.3 AC, 146.3 AE, 146.3 ED, 146.3 FT, 146.3 MA, 146.3 SG, 146.3 WD

[56] References Cited

UNITED STATES PATENTS

| | | | |
|---|---|---|---|
| 3,189,873 | 6/1965 | Rabinow | 340/146.3 |
| 3,223,973 | 12/1965 | Chatten | 340/146.3 |
| 3,289,164 | 11/1966 | Rabinow | 340/146.3 |
| 3,462,737 | 8/1969 | Malaby | 340/146.3 |
| 3,526,876 | 9/1970 | Baumgartner et al. | 340/146.3 |
| 3,587,047 | 6/1971 | Cutaia | 340/146.3 |

*Primary Examiner*—Thomas A. Robinson
*Attorney*—J. Michael Anglin et al.

[57] ABSTRACT

The height and width of a binary input pattern are measured and the pattern is loaded into a read/write memory. The height and width signals select stored vertical and horizontal normalization vectors which address specific locations in the read/write memory so as to transfer certain of the input-pattern bits to an output memory for subsequent recognition. Each normalization vector has a series of digits for specifying addresses within the read/write memory. Horizontal and vertical registration signals may also be combined with the normalization-vector elements to modify the selected read-write memory locations, in order to move the input pattern to a reference location in the output memory.

15 Claims, 2 Drawing Figures

INVENTORS.
DOUGLAS R. ANDREWS
MILTON J. KIMMEL
BY
ATTORNEY

PATTERN-SIZE NORMALIZING FOR RECOGNITION APPARATUS

BACKGROUND OF THE INVENTION

The present invention relates to the machine recognition of lexical characters or other patterns. More particularly, it concerns methods and apparatus for transforming input patterns of arbitrary sizes and positions into standardized patterns which are more easily recognizable by conventional electronic circuits.

One of the most vital and difficult links in the process of machine recognition of characters and other patterns is in the area generally known as "preprocessing." This area usually includes the functions of registering the position of the input pattern to a predetermined base line, separating it from adjacent patterns, scaling its height and width to certain standard values, and enhancing its contrast with respect to a background level.

Since most present-day recognition circuits are sensitive to the size and position of the input pattern, it is necessary that the pattern be translated to a reference position and that its overall size be scaled to a known value. Heretofore, most recognition machines have performed these latter functions by measuring the height, width and distance of the pattern, and then adjusting the height, spacing and position of a controllable scanning beam in order to standardize the pattern. This conventional approach has two major drawbacks. First, each character to be standardized must be scanned at least twice: once for determining the size and position parameters of the pattern, and subsequently for actual recognition. Secondly, this technique is not applicable to scanners which cannot produce variable patterns, such as linear array scanners and high-speed mechanical scanners. One prior system has attempted to overcome the above problems by internally transferring an electronic image of the input pattern from one memory to another, and controlling the size of the pattern in the second memory by regulating the speed of the transfer. That is, the latter technique is an electronic analog of the more usual beam-speed regulation. But this approach has its disadvantages. Since the pattern in the first memory has already been quantized into binary digits, the bits in the second memory are a poorly defined function of the bits in the first memory. Moreover, the continuous variation in transfer speed requires accurate analog circuitry, and must operate asynchronously with respect to timing waveforms in the remainder of the machine.

SUMMARY OF THE INVENTION

The present invention overcomes the foregoing and other difficulties in pattern normalization and registration by the transfer of an electronic image of the input pattern from one memory into another under the control of mapping vectors which are selected by measuring a size of the pattern in a first dimension or direction. Each vector has a plurality of elements or components for controlling the transfer of a particular element or bit of the input pattern from the first memory to the second memory. A particular vector is selected for each input pattern under the control of a signal representing the size of that pattern.

Normalization may also be performed in two dimensions, without requiring another memory, by the selection of a pair of mapping vectors under the control of separate height and width signals.

Registration of the input pattern to a predetermined standard position or base line may be accomplished under the control of a signal representing the distance of the input pattern in the first memory from the standard location; this signal then modifies the effect of each vector element upon the transfer of the pattern image from the first memory to the second memory.

Accordingly, it is an object of the present invention to advance the pattern-recognition and allied arts by providing normalization methods and apparatus for transforming the size of an input pattern in a manner which is economical, accurate, flexible and reliable.

Another object of the invention is to provide methods and apparatus for registration of an input pattern to a predetermined location.

Further objects and advantages of the invention, as well as modifications obvious to those skilled in the applicable arts, will become apparent in the following description of a preferred embodiment of the invention, taken in conjunction with the accompanying drawing.

DETAILED DESCRIPTION

Figure 1:
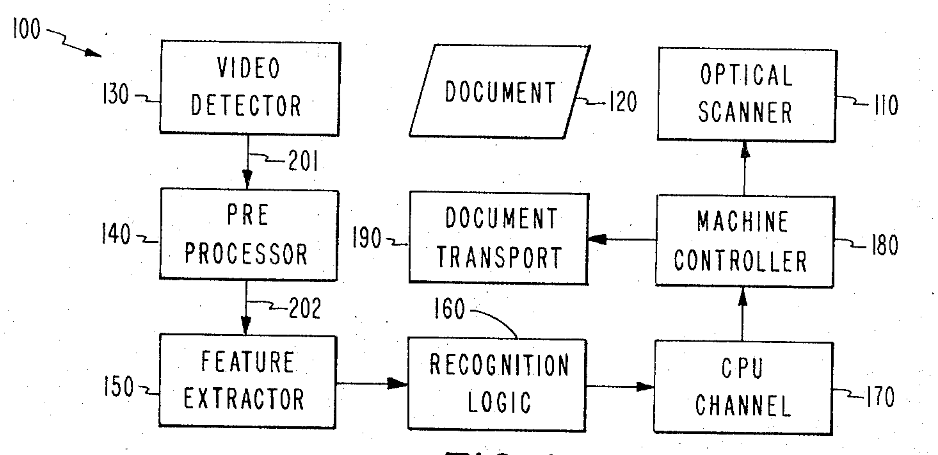
FIG. 1 is a simplified block diagram of a pattern-recognition machine in which the invention finds utility.

FIG. 1 is a simplified block diagram of a character recognition machine in which the present invention finds particular utility. In system 100, scanner 110 produces an optical scanning pattern over document 120, which contains the characters to be recognized. Scanner 110 may conveniently be a sequentially pulsed linear array of light-emitting diodes for executing a raster scan over predetermined areas of document 120. For simplicity, such characters will be assumed to be of a black color, and the document background will be assumed to be white; other color combinations would of course be possible with a suitable scanner. Video detector 130 receives reflections from document 120 and translates them into a string of data bits which may be quantized in both time and amplitude. In the following discussion, each bit will be assumed to represent a specific area on document 120 which may be, for instance, a square whose side is 0.005 inches. A "one" value of any bit will be assumed to represent a black (character) area on document 120, while a "zero" value will represent a white (background) area.

Figure 2:
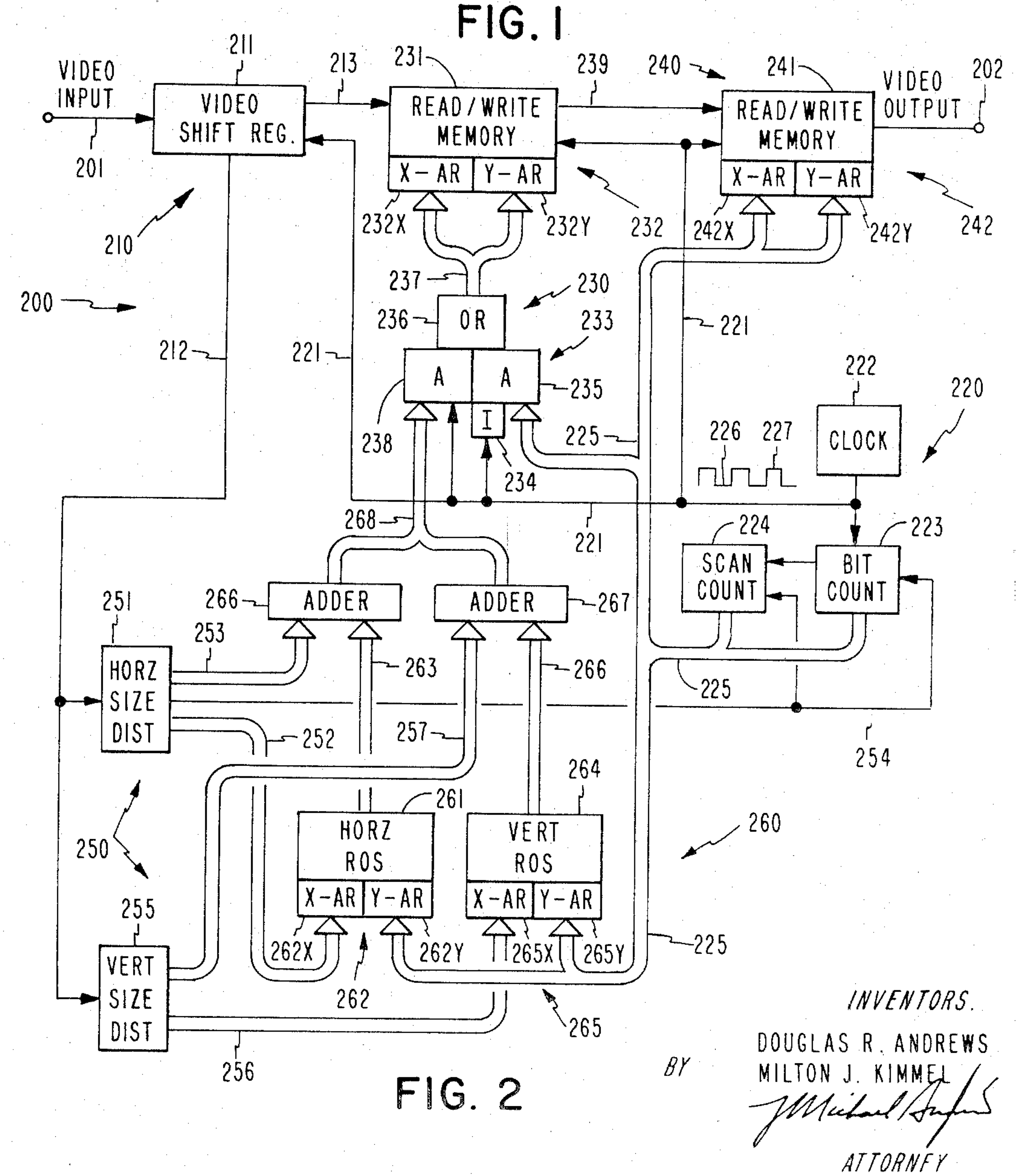
FIG. 2 is a block diagram of normalization and registration apparatus embodying the invention.

Preprocessor 140 receives the quantized stream of video bits from detector 130 and transforms them into an electronic image suitable for further processing by the remaining units of system 100. The functions performed by preprocessor 140 may include the storage of the video bits as an electronic image of the input character, measurement of the size and position of an input pattern, separating or segmenting the pattern from adjacent patterns, converting the input pattern into another electronic image having a predetermined size, position and resolution, and enhancing the contrast of the pattern with respect to the background of document 120. Means for performing all of these functions are known in the prior art. The present invention provides an improved means and method for performing the above-mentioned size normalization and position registration functions within preprocessor 140, as will be described in greater detail in connection with FIG. 2.

Feature extractor 150 receives a standardized electronic image of the input pattern, from which it may derive certain features or measurements useful in classifying the pattern. Recognition logic 160 performs the actual classification of the input pattern into one of a set of possible categories by combining certain features from feature extractor 150, or by other conventional techniques. A signal identifying the input character is then transmitted to central processing unit (CPU) channel 170 for further processing and disposition. Channel 170 may also emit signals to machine controller 180 for specifying various operations to be performed by system 100, such as control of document transport 190.

Apparatus 200 (FIG. 2) performs the size normalization and position registration functions of preprocessor 140 according to the concepts of the present invention.

A string of input data, representing an input pattern, enters input memory 210 on line 201, which is coupled to video detector 130. Although the input data may be coded in gray levels or entered in parallel if desired, it will be assumed herein that line 201 carries a single stream of serial binary digits or bits, and that each bit indicates the reception of one of two colors in a different spot or area on document 120. It will be further assumed for purposes of illustration that each scan produced by scanner 110 contains 64 vertically aligned areas or cells, and that each input pattern or character occupies a maximum of 32 scans in a horizontal direction. Given such a data format, input memory 210 may conveniently be a serial shift register 211.

Timing generator 220 controls the shifting of register 211 by a signal on line 221. Generator 220 contains a clock 222 which is synchronized by conventional means to scanner 110 to provide a pulse for each cell or area to be scanned. Counters 223 and 224 accumulate a total number of clock pulses issued since the beginning of a particular input pattern or some other arbitrary point. Counter 223 contains the low-order six bits of the total, which indicates the instantaneous vertical position of scanner 110 within a particular scan line. Counter 224, which is advanced by a carry pulse from counter 223, contains the high-order five bits of the total, which represents the instantaneous horizontal position of scanner 110 within an input character. Thus, the counter outputs on line 225 represent specific locations of the bits on line 201 within an input pattern. Timing generator 220 also controls the storing of the video bit stream in storage unit 230. Unit 230 includes a single-bit-per-word, 2,048-word read/write memory 231, memory address register (MAR) 232 and logic switch unit 233. For ease on conceptualizing the electronic image stored in memory 231, MAR 232 has been divided into high-order portion 232X and low-order portion 232Y. When the clock signal is logic "-zero" (226) during each bit cycle, line 221 energizes a "write" mode of memory 231 so as to enter a bit which is shifted out of register 211, on line 213. Since line 221 also controls the shifting of register 211, successive write operations of memory 231 will store successive bits of the video bit stream. During the write mode, clock phase 226 causes inverter 234 to enable AND gate 235 to pass the count signals on line 225 through OR gate 236 or MAR 232, via line 237. Therefore, successive bits on line 213 are stored in consecutive locations in memory 231. The 2,048 locations of memory 231 may be visualized as an array 64 bits high (i.e., in the Y-direction or dimension) and 32 bits wide (X-dimension). The low order six bits on line 237 are applied to MAR portion 232Y to address the 64 cells in each column of the Y-direction, and the high-order five bits are applied to MAR portion 232X to address the 32 rows in the X-direction. Since these two groups of bits are generated respectively in bit counter 223 and scan counter 224, successive write operations cause memory 231 to store a two-dimensional image of the video bit stream representing the input pattern.

Clock pulses 227 on line 221 energize a "read" mode of memory 231 and a "write" mode of output storage unit 240, so that data from specified locations of memory 231 are successively transferred on line 239 to a single-bit-per-word, 512-word read/write memory 241. MAR 242 is also cycled by the outputs of counters 223 and 224, so that successive bits from memory 231 are stored in contiguous locations in memory 241, so as to form another two-dimensional image of the input pattern. Again, memory 241 may be visualized as an array 32 cells high (Y-direction) by 16 cells wide (X-direction). MAR 242 may be then divided into a low-order portion 242Y for receiving the first through fifth bits of line 225, and a high-order portion 242X for receiving the seventh through 10th bits on this line. A binary "one" in either the sixth or 11bit position specifies non-existent locations in memory 241; hence, such addresses cause no reading or writing action in this memory.

The size of the input pattern is normalized to a predetermined standard size during the transfer of the bit stream or electronic image between memories 231 and 241. "Size," in the context of the digitized bit stream, signifies the number of bits along a predetermined direction or dimension. In the exemplary embodiment 200, the input pattern may range up to 64 bits high by 32 bits wide, while the standard size is 32 bits of height and 16 bits of width. Moreover, although the present technique is capable of both reduction and enlargement of the input-character size, the implementation herein described does not alter the height of any character less tall than the standard height value, nor does it change a character width which is smaller than the standard width. Besides the hardware savings accomplished thereby, these restrictions are desirable in many cases for other reasons: e.g., so that a dash or period will not be expanded into a large blob.

In the first stage of the normalization process, measuring means 250 computes the size of the input pattern. More specifically, unit 251 accepts an output 212 of shift register 211 to determine the beginning and the end of the input pattern in the horizontal or X-direction. Means for performing this function are well known in the art; a representative example may be found in, e.g., U. S. Pat. No. 3,526,876, issued to R. J. Baumgartner et al. Line 252 then carries a digital signal indicating the number of scans in the pattern. Similarly, unit 255 determines the upper and lower vertical extremities of the pattern, and produces a signal on line 256 indicating the number of cells in each scan of the pattern. Such vertical measuring means are also known in the art, e.g., U. S. Pat. No. 3,462,737, to D. L. Malaby.

Units 251 and 255 are also capable of measuring the distance from a predetermined point in the pattern to a predetermined reference point for registration purposes. Conventional circuits for executing this function are shown in, e.g., U. S. Pat. No. 3,587,047, to A. Cutaia. For purpose of illustration, it will be assumed that a corner-registration technique is used, in which the lower edge of the pattern is referenced to the bottom of the scan, and the left side of the pattern is referenced to a predetermined horizontal point. Thus, line 257 carries a digital signal indicating the vertical distance of the character bottom from the bottom of each scan. In terms of the image stored in memory 231, this distance represents the value of the low-order six bits of the address of that memory location which holds the lowermost pattern bits. Similarly, line 253 carries a digital signal indicating the horizontal distance of the left side of the pattern from the left side of memory 231; this distance then represents the value of the high-order five bits of the address of that location in memory 231 which holds the leftmost column of pattern bits.

A signal on line 254, produced by the beginning of each new input pattern, resets counters 223 and 224 for each new character. For a memory 231 which holds only a single pattern at a time, it may be possible to eliminate the horizontal registration line 253; then, if the signal on line 254 resets counters 223 and 224 to zero, the left side of the pattern will be automatically stored in the first column of memory 231. Alternatively, it may be desirable in some applications to eliminate line 254, thus allowing the counters to cycle continuously through all addresses of memory 231.

Given the actual dimensions and registration distances of the input pattern, normalization and registration means 260 controls MAR 232 to map data bits from memory 231 into the proper locations of output memory 241 by an address transformation technique. Let $X_{in}$ and $Y_{in}$ be the address or coordinates of a cell of the image stored in memory 231 and let $X_{out}$ and $Y_{out}$ be the address in memory 241 at which the $X_{in}$, $Y_{in}$ data bit should be stored in order to achieve the desired mapping function. That is, the quantities $X_{in}$, $Y_{in}$, $X_{out}$, $Y_{out}$ represent digital numbers which should be simultaneously applied to MAR's 232X, 232Y, 242X and 242Y, respectively. Then the desired transformation may be represented by the matrix equation $$\begin{bmatrix} X_{out} \\ Y_{out} \end{bmatrix} = \begin{bmatrix} W_d/W_a & 0 \\ 0 & H_d/H_a \end{bmatrix} \begin{bmatrix} X_{in}-X_1 \\ Y_{in}-Y_b \end{bmatrix} \qquad (1)$$

where $W_d$ and $W_a$ represent the desired and actual widths of the pattern, $H_d$ and $H_a$ represent the desired and actual heights of the pattern, and $X_1$ and $Y_b$ represent the horizontal and vertical registration or offset distances. The off-diagonal zeroes in the above matrix signify the absence of any coupling between the horizontal and vertical coordinates; these terms may be made non-zero if it is desired to employ skew or rotation correction of an input pattern.

To reduce the hardware required for normalization, it is more practical to employ the inverse of the above transformation, namely, $$\begin{bmatrix} X_{in} \\ Y_{in} \end{bmatrix} = \begin{bmatrix} K_h & 0 \\ 0 & K_v \end{bmatrix} \begin{bmatrix} X_{out} \\ Y_{out} \end{bmatrix} + \begin{bmatrix} X_1 \\ Y_b \end{bmatrix} \qquad (2)$$

where $K_h = W_a/W_d$ and $K_v = H_a/H_d$. This transformation requires one multiplication and one addition operation for each dimension. It has been found, however, that the required multiplications may be performed indirectly by the use of mapping or normalization vectors stored in read-only storage (ROS) units 261 and 264. ROS 261 has an address register MAR 262 having a four-bit high-order portion 262X and a five-bit low-order portion 262Y, for addressing a total of 512 words of five bits each. If ROS 261 is visualized as a 32×16 array of words, each vertical column of words represents one of 16 normalization vectors, and each horizontal row represents one of 32 elements of the 16 vectors. Because of the above-mentioned restriction against image expansion, all character widths less than 16 scans operate to access the first vector, stored at column address "0000." The vectors for larger widths are then stored in sequence, at column addresses of $W_a$−16. Therefore, the size signal on line 252 selects one vector, corresponding to the ratio of the measured actual width of the input pattern to the constant desired width of the input pattern to the constant desired width. When a particular vector has been selected, the output of scan counter 224 is applied to MAR portion 262Y to step through each element of the selected vector, successively outputing the element values for words on line 263.

Horizontal registration is provided by combining the successive vector elements appearing on line 263 with the measured horizontal registration distance on line 253 in adder 266, which effectively translates the value of each vector element by a constant amount. The output of adder 266 forms a high-order portion of an address which is transmitted on line 268 through switch 233 to the high-order portion 232X of MAR 232, during the read mode of memory 231.

Vertical normalization and registration are performed in a similar manner. A five-bit vertical-size signal on line 256 controls a high-order portion 265X of MAR 265, while a six-bit signal on line 225 from cell counter 223 controls the low-order portion 265Y. Visualizing the 2,048 addressable six-bit words of ROS 264 as an array of 32 normalization vectors each having 64 elements, the address in MAR portion 265X selects a particular vector based upon the actual vertical height of the input pattern in relation to the standard height, while successive elements of the selected vector are read out by the bit count in MAR portion 265Y. All characters less than 32 cells high access the first vector, stored at column address "00000." Vectors for larger height values are stored at column addresses of $H_a$−32. Each six-bit vector element or word is combined with the measured vertical registration or offset distance appearing on line 257, in adder 267. The output of adder 267 then provides the low-order six bits of an address to MAR portion 232Y via lines 268 and 237, during the read mode of memory 231.

Taking a specific example to illustrate the operation of system 200, suppose that the actual height and width of an input character are 56 and 24 bits or cells respectively, while the vertical and horizontal registration distances are six and two cells respectively. In the particular embodiment described hereinabove, the standard height and width of the output image are 32 and 16 cells respectively, with a standard offset distance of zero in both directions. In terms of equation (2), $K_v = 1.75$ and $Y_b = 6$, while $K_n = 1.5$ and $X_1 = 2$. For convenience of explanation, addresses in memories 231, 241, 261 and 264 will be represented as number pairs in parentheses, the first number in each pair being the high-order portion, corresponding to the X-direction or dimension. It must be borne in mind that, because of the elimination of separate vectors for height and widths less than the standard values, the actual column addresses of the horizontal and vertical vectors are respectively 16 and 32 units less than the actual width and height values. Additionally, the 32 scans and 64 vertical cells of memory 231 are numbered 0 through 31 and 0 through 63 respectively.

When the transfer of the pattern from memory 231 to memory 241 begins, both the bit counter 223 and the scan counter 224 are reset to zero. Therefore, the initial address of character MAR 265 is (24,0), representing vector 56−32 = 24, element 0. The word stored in location (24,0) of memory 264 has a binary value "000000," which represents the element value of $K_v\,Y_{out}$ for $Y_{out} = 0$, rounded to the nearest integer. The word "000000" is then transferred on line 266 to adder 267, where it is combined with the number "000110," which is the binary equivalent of the vertical registration distance $Y_b = 6$. The latter number then passes through switch 233 to MAR 232Y. Similarly, the initial address in MAR 262 is (8,0), representing the first element of vector 24−16 = 8. The word in location (8,0) of ROS 261 has a binary value "00000," which represents the value of $K_h\,X_{out}$ for $X_{out} = 0$. This value is translated to binary "00010" by the addition of $X_1 = 2$ in adder 266, and the latter value is lodged in MAR 232X via switch 233.

At this point, MAR 232 contains the address (2,6), while MAR 242 contains the address (0,0). Therefore, clock phase 226 operates to transfer the bit in location (2,6) of memory 231 to the location (0,0) of memory 241. A partial listing of the results obtained during subsequent clock periods is shown in the table below.

| H-ROS Address MAR 262 | V-ROS Address MAR 265 | H-Vector Element MEM 261 | V-Vector Element MEM 264 | Input Address MAR 232 | Output Address MAR 242 |
|---|---|---|---|---|---|
| (8,0) | (24,0) | 0 | 0 | (2,6) | (0,0) |
| " | (24,1) | 0 | 2 | (2,8) | (0,1) |
| " | (24,2) | 0 | 4 | (2,10) | (0,2) |
| " | (24,3) | 0 | 5 | (2,11) | (0,3) |
| " | (24,4) | 0 | 7 | (2,13) | (0,4) |
| " | (24,5) | 0 | 9 | (2,15) | (0,5) |
| " | (24,6) | 0 | 11 | (2,17) | (0,6) |
| " | (24,7) | 0 | 12 | (2,18) | (0,7) |
| " | (24,8) | 0 | 14 | (2,20) | (0,8) |
| " | (24,63) | 0 | 55 | (2,61) | (0,31) |
| (8,1) | (24,0) | 2 | 0 | (4,6) | (1,0) |
| " | (24,1) | 2 | 2 | (4,8) | (1,1) |
| " | (24,2) | 2 | 4 | (4,10) | (1,2) |
| " | (24,3) | 2 | 5 | (4,11) | (1,3) |
| " | (24,4) | 2 | 7 | (4,13) | (1,4) |
| " | (24,63) | 2 | 55 | (4,61) | (1,31) |
| (8,2) | (24,0) | 3 | 0 | (5,6) | (2,0) |
| " | (24,1) | 3 | 2 | (5,8) | (2,1) |
| " | (24,2) | 3 | 4 | (5,10) | (2,2) |
| " | (24,63) | 3 | 55 | (5,61) | (2,31) |
| (8,3) | (24,0) | 5 | 0 | (7,6) | (3,0) |
| " | (24,1) | 5 | 2 | (7,8) | (3,1) |
| " | (24,2) | 5 | 4 | (7,10) | (3,2) |
| (8,31) | (24,0) | 23 | 0 | (25,6) | (15,0) |
| " | (24,1) | 23 | 2 | (25,8) | (15,1) |
| " | (24,2) | 23 | 4 | (25,10) | (15,2) |
| " | (24,3) | 23 | 5 | (25,11) | (15,3) |
| " | (24,4) | 23 | 7 | (25,13) | (15,4) |
| " | (24,63) | 23 | 55 | (25,61) | (15,31) |

It will be noted from the table that the horizontal-vector element values and vertical-vector element values represent a rounding to the nearest integer of the quantities $K_hX_{out}$ and $K_vY_{out}$ for successive integral values of $X_{out}$ and $Y_{out}$, where $K_h$ and $K_v$ are parameters which are constant for any given character. Other relationships may, however, be established merely by modifying the contents of ROS 261 and ROS 264. It is a simple matter, for instance, to incorporate vector-element values such that the column and rows of memory 231 containing the extreme edges of the character are always transmitted to memory 241, or to incorporate values which transmit rows and columns symmetrically about a predetermined centerline of the pattern. It is also possible to generate element values corresponding to non-linear transformations in which, for instance, the size of the character in memory 241 depends upon its size in memory 231, or upon an external font-selection or case-selection signal, or upon an externally generated character-pitch decision. It is also possible to generate transforms in which different areas of the input character are compressed and/or expanded unequally.

In the present embodiment, horizontal rows (such as 1, 3, 6, 8, 10, etc., in the above table) or vertical columns (such as 1, 4, etc., in the table) of the input memory 231 which are not selected by the vector elements, are merely deleted from the output character stored in memory 241. It may be desirable in some situations to take such deleted rows or columns into account in the output character. For very light printing, for instance, a selected row could be OR'ed with a preceding deleted row to increase the video density of the output character; for very dark characters, on the other hand, adjacent selected and deleted rows may be AND'ed with each other to decrease the video density.

Further modifications to the illustrated embodiments will also occur to those skilled in the applicable arts. Memory unit 230 and 240, for example, may be implemented as part of a single physical structure, and may be capable of holding and accessing a plurality of input and/or output character images simultaneously. One or both of the units 230 and 240 may be implemented fully or partially as shift registers with suitable gating facilities. Certain types of measurement unit 250 may eliminate a requirement for shift register unit 210. The form and specific control of timing unit 220 may vary for particular installations. Facilities may also be included to load or modify the content of memories 261 and 264 from an external device, or under the control of various signals within OCR system 100.

Having described a preferred embodiment of our invention and a few of the modifications within the spirit and scope thereof, we claim:

1. A method for normalizing a string of input data having a plurality of individual elements, said method comprising the steps of:

a. storing a set of normalization vectors associated with a plurality of possible sizes of said string of input data, each said vector having a plurality of elements.

b. measuring an actual size of said string in a first dimension;

c. accessing that one of said vectors associated with said actual size of said string; and d. selecting predetermined ones of said input-data elements in response to the value of corresponding elements of said accessed vector, so as to convert said string of input data into a string of output data having a standard size in said first dimension.

2. A method according to claim 1 wherein each of said input- and output-data elements is a binary digit.

3. A method according to claim 2 wherein said actual size of said input-data string is measured as the number of said input-data elements in said predetermined dimension, and wherein said standard size is a predetermined number of said data elements.

4. A method according to claim 3, further comprising the step of loading said input-data elements into a predetermined sequence of addressable storage locations in a read/write memory.

5. A method according to claim 4 wherein said selecting step comprises accessing a sequence of said input-data elements from those of said storage locations determined by successive elements of said accessed vector.

6. A method according to claim 5 wherein each element of said accessed vector contains a binary representation of an address of one of said locations in said read-write memory.

7. A method according to claim 5, further comprising the step of loading said sequence of accessed input-data elements into contiguous locations of an output memory.

8. A method according to claim 3, further comprising repeating steps (a) through (d) for a second dimension of said string of input data.

9. A method according to claim 8 wherein said set of normalization vectors is divided into first and second subsets associated respectively with said first and second dimensions.

10. A method according to claim 3, further comprising the steps of measuring a distance of a predetermined element of said input-data string from a reference location; and modifying the element values of said accessed vector in response to said measured distance so as to register a predetermined element of said output-data string to said reference location.

11. A method according to claim 10 wherein said measured distance is added to the value of each element of said accessed vector.

12. In a pattern-recognition system, the combination comprising:

a detector for producing a string of digits representing an input pattern;

read/write memory means for storing said digits at a plurality of addressable locations;

means for producing a size signal representing the number of said digits of said input pattern in a first direction;

vector memory means for storing a set of multi-element vectors at a plurality of addressable locations;

means for selecting one of said vectors from said vector memory means in response to said size signal;

means for addressing a plurality of locations in said read/write memory means in response to stored values of a plurality of elements of said selected vector; and means for classifying said input pattern into one of a set of categories in response to those digits stored in said addressed locations of said read/write memory.

13. A system according to claim 12, further comprising:

means for producing a further size signal representing the number of said input-pattern digits in a second direction;

means for selecting a further vector from said vector memory means in response to said further size signal; and means for controlling said read/write memory addressing means in response to a plurality of elements of said further selected vector.

14. A system according to claim 12, further comprising:

means for producing a registration signal representing the position of said input-pattern digits with respect to a reference position;

means coupled to said vector memory means for varying said addressed locations in said read/write memory in response to said registration signal.

15. A system according to claim 12, further comprising:

output memory means having a plurality of addressable locations; and means for loading successive ones of those digits stored in said addressed locations in said read/write memory into contiguous locations of said output memory means.

* * * * *